Aug. 23, 1960   R. D. RUMSEY   2,950,101
DAMPER
Filed June 27, 1957
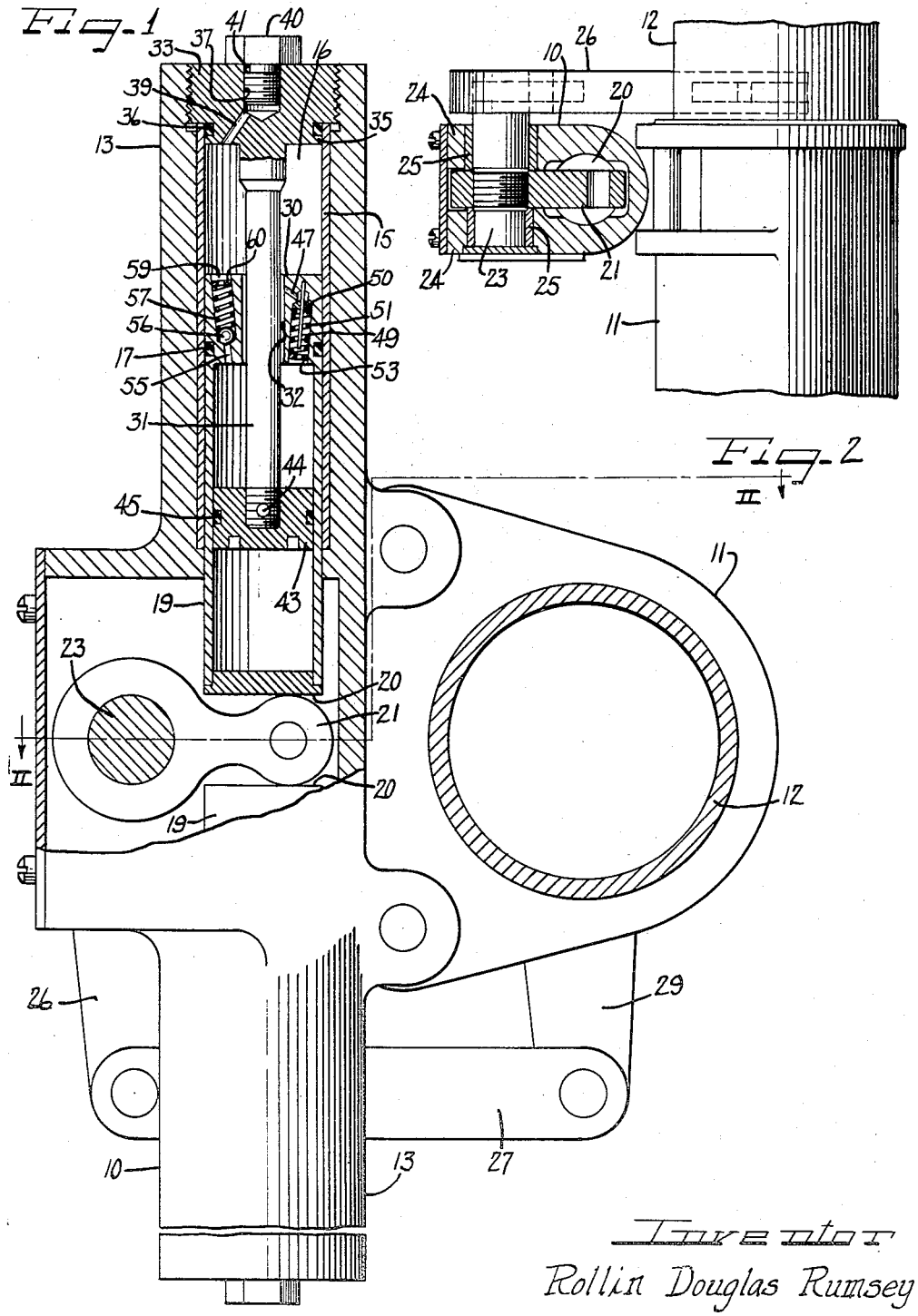
Inventor
Rollin Douglas Rumsey United States Patent Office 2,950,101
Patented Aug. 23, 1960

2,950,101

DAMPER

Rollin Douglas Rumsey, Buffalo, N.Y., assignor to Houdaille Industries, Inc., Buffalo, N.Y., a corporation of Michigan Filed June 27, 1957, Ser. No. 668,498

2 Claims. (Cl. 267—1)

This invention relates to improvements in dampers and more particularly relates to a damper capable of both centering and damping the movable parts of aircraft.

A principal object of the invention is to provide a simple and improved form of damper utilizing a compressible damping liquid, in which the compressed damping liquid acts as a return spring to center the movable part being damped.

Another object of the invention is to provide a linear damper particularly adapted to damp swiveled landing gear and like structures of aircraft, and to center the damped structure by the resiliency of the compressed damping fluid.

A still further object of the invention is to provide a liquid spring centering the swiveling parts of aircraft and providing a centering force in which a proportion of the energy of the centering liquid is dissipated to damp the tendency of the swiveling parts to flutter.

A still further object of the invention is to provide a liquid spring centering and damping unit utilizing a pair of oppositely acting spring damper units and thereby eliminating back-lash in the damped and centered assembly.

These and other objects of the invention will appear from time to time as the following specification proceeds and with reference to the accompanying drawing wherein:

Figure 1 is a bottom plan view of a centering damper constructed in accordance with the invention, with certain parts thereof broken away and certain other parts shown in horizontal section and showing the damper mounted on the Oleo strut for an airplane; and Figure 2 is a vertical sectional view drawn to a reduced scale and taken substantially along line II—II of Figure 1, and showing a portion of the Oleo strut broken away.

In the embodiment of the invention illustrated in the drawing, I have shown a damping and centering housing 10 mounted on a housing 11 for a spindle 12 for an aircraft wheel (not shown). The housing and spindle may be a part of the usual Oleo strut and need not herein be shown or described further since they form no part of the present invention.

The housing 10 has two integrally formed laterally spaced cylinders 13 extending transversely of the spindle 12, each of which has a sleeve 15 mounted therein, the inner wall of which defines a damping and liquid spring chamber 16.

Slidably mounted within each sleeve 15 and sealed with respect thereto, as by a sealing ring 17, is a cylinder assembly 19 closed at its outer end by an end closure 20. The end closures 20 abut opposite arcuate faces of a lever 21, mounted within the housing 10 on a vertical shaft 23. The vertical shaft 23 is shown in Figure 2 as having the lever 21 threaded thereon intermediate its ends. A suitable locking means, such as a locking pin (not shown) may be provided to lock the lever 21 on said shaft. The shaft 23 is journaled in opposite walls of the housing 10 in outwardly spaced relation with respect to the cylinder assemblies 19 on spaced sleeve bearings 25.

The shaft 23 has a lever 26 secured to its upper end and extending outwardly therefrom along the left hand cylinder 13, for a portion of the length thereof, and connected at its free end with the steering spindle 12 by a link 27 and a lever 29 operatively connected with said steering spindle in a well known manner, so not herein shown or described further. Thus, upon turning movement of the spindle 12 in one direction or another, the lever 21 will retractably move a respective cylinder assembly 19 within its sleeve 15.

The cylinder assemblies 19 and damping and centering devices associated therewith are identical so only one of said cylinder assemblies and damping and centering devices need herein be shown or described in detail.

As herein shown, the cylinder assembly 19 has a head on its inner end in the form of an annular piston 30. The inner wall of said annular piston is spaced outwardly from a metering pin 31 extending through the center of said piston. The space between said metering pin and said inner wall of said piston defines an annular orifice 32, for dissipating energy and thereby damping the tendency of the lever 21, the spindle 12 and the parts mounted thereon to flutter or vibrate.

The metering pin 31 is herein shown as being formed integrally with a head 33 for the cylinder 13. The head 33 is threaded in the outer end of the cylinder 13 and has a reduced diameter portion 35, extending within the sleeve 15 and sealed therein as by an O-ring seal 36. The head 33 also has a drilled chamber 37 leading thereinto from the outer end thereof, having a filler passageway 39 leading from said chamber into the liquid spring and damping chamber 16. A filler plug 40 is shown as being threaded within the chamber 37 and as being sealed thereto as by an O-ring seal 41.

The liquid spring and damping chamber 37 may thus be filled with compressible liquid through the filling chamber 37. The compressible liquid may be a liquid having a silicone base, which will operate both as a spring and damping liquid.

The metering pin 31 extends along the liquid spring and damping chamber 16 through the annular piston 30, within the cylinder assembly 19, and has a piston 43 threaded on its inner end and retained in position thereon, as by a locking pin 44. The piston 43 is sealed to the inner wall of the cylinder assembly 19 as by a sealing ring 45.

The annular piston 30 has a passageway 47 leading thereinto from the inner wall thereof. The passageway 47 has communication with a blow-off valve chamber 49 for a blow-off valve 50, and supplies fluid under pressure to open said blow-off valve upon excessive pressure conditions. The blow-off valve 50 is biased into engagement with its seat by a compression spring 51, which may be loaded by a collar 53 abutting the opposite end of the spring 51 from the blow-off valve 50 and may be threaded within the blow-off chamber 49. The spring 51 accommodates the valve 50 to open upon a predetermined pressure differential on opposite sides of said blow-off valve, to relieve excessive pressures from the liquid spring and damping chamber 16.

During extensible movement of the cylinder assembly 19 with respect to the sleeve 15, effected by the resiliency of the compressed liquid within the liquid spring and damping chamber 16, fluid is freely returned from the cylinder assembly 19 through the orifice 32 and through the annular piston 30 through a by-pass passageway 55 and check valve chamber 59. A check valve 56 is provided in the check valve chamber 59 and is biased into engagement with its seat by a spring 57, retained within said check valve chamber by a collar 60, which may be threaded within said check valve chamber.

During operation of the device, as either of the cylinder assemblies 19 are retractably moved within the sleeve 15 by operation of the lever 21, the compressible liquid within the liquid spring and damping chamber 16 will be compressed to the extent of the volume of compressible liquid displaced by the wall of the annular piston 30. As, however, the pressure tending to retractably move the cylinder assembly 19 is relieved, the compressed liquid will tend to return to its original state and return the lever 21 to the centered position shown in Figure 1.

As the end closure 20 moves toward the piston 43, the air in the space between said end closure and piston will be compressed and the compressed air will act in addition to the compressed fluid to center the lever 21.

It should be understood, however, that where it is not desired to compress the air in series with the compressible liquid that the head 20 may be vented to atmosphere.

Also, the air chamber may be precharged with air under high pressure through valving (not shown) where improved performance of the centering device is required.

Upon excessive pressure conditions compression of the liquid is relieved by opening of the blow-off valve 20, and the tendency of the lever 21 to flutter or vibrate is damped in all positions of said lever by the dissipation of energy through the annular orifice 32.

It should here be understood that the two opposed liquid springs are preloaded and balanced to the extent necessary to effect centering of the lever 21, and the two springs and dampers always provide a centering force on said lever, as well as a damping action, and therefore act to prevent back-lash from being introduced in the system.

It will be apparent from the foregoing that various modifications and variations in the invention may be effected without departing from the spirit and scope of the novel concepts thereof.

I claim as my invention:

1. In a combined centering device and damper, a housing having two spaced aligned cylindrical damping chambers therein, having closed outer end walls, a separate cylinder guided within each cylindrical chamber for extensible and retractable movement with respect thereto, each cylinder having an annular piston on its inner end and a head closing the outer end thereof, a metering pin extending along each cylindrical chamber in axial alignment with said annular piston and through the open portion thereof in inwardly spaced relation with respect thereto, the space between the open portion of said annular piston and said metering pin defining a damping orifice, a compressible liquid filling said damping chambers, a pivoted lever having operative connection with a device to be centered and having engagement with the closed ends of said cylinders and moving one cylinder in a direction to compress the compressible liquid within the respective damping chamber and returned to a centered position by expansion of the compressible liquid within the respective damping chamber upon the release of actuating pressure thereon, and a separate by-pass return valve in each annular piston accommodating movement of said pistons in a centering direction by the force of expansion of the compressible liquid.

2. In a combined centering device and damper, a housing having two spaced aligned cylindrical damping chambers therein, having closed outer end walls, a separate cylinder guided within each cylindrical chamber for extensible and retractable movement with respect thereto, each cylinder having an annular piston on its inner end and a head closing the outer end thereof, a metering pin extending along each cylindrical chamber in axial alignment with said annular piston and through the open portion thereof in inwardly spaced relation with respect thereto, the space between the open portion of said annular piston and said metering pin defining a damping orifice, a compressible liquid filling said damping chambers, a pivoted lever having operative connection with a device to be centered and having engagement with the closed ends of said cylinders and moving one cylinder in a direction to compress the compressible liquid within the respective damping chamber and returned to a centered position by expansion of the compressible liquid within the respective damping chamber upon the release of actuating pressure thereon, a separate by-pass return valve in each annular piston accommodating movement of said pistons in a centering direction by the force of expansion of the compressible liquid, and a separate blow-off valve in each piston loaded to relieve said chamber from excessive pressure upon movement of said piston in a compressing direction.

References Cited in the file of this patent

UNITED STATES PATENTS

| | | |
|---|---|---|
| 2,220,995 | Davis | Nov. 12, 1940 |
| 2,346,667 | Dowty | Apr. 18, 1944 |
| 2,385,891 | Swanson | Oct. 2, 1945 |
| 2,559,967 | Katz | July 10, 1951 |
| 2,756,952 | Gazley | July 31, 1956 |
| 2,868,537 | Harvey | Jan. 13, 1959 |
| 2,909,368 | Taylor | Oct. 20, 1959 |

FOREIGN PATENTS

| | | |
|---|---|---|
| 664,972 | Great Britain | Jan. 16, 1952 |